(12) United States Patent
Shuster et al.

(10) Patent No.: US 11,593,102 B1
(45) Date of Patent: *Feb. 28, 2023

(54) MANAGING SHARABLE CELL-BASED ANALYTICAL NOTEBOOKS

(71) Applicant: Palantir Technologies Inc., Palo Alto, CA (US)

(72) Inventors: James Shuster, Rockville, MD (US); Daniel Fernandez, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,505

(22) Filed: Jan. 12, 2022

Related U.S. Application Data

(63) Continuation of application No. 16/994,276, filed on Aug. 14, 2020, now Pat. No. 11,226,967, which is a
(Continued)

(51) Int. Cl.
   *G06F 9/44* (2018.01)
   *G06F 8/71* (2018.01)
   (Continued)

(52) U.S. Cl.
   CPC ............ *G06F 8/71* (2013.01); *G06F 9/45558* (2013.01); *G06F 21/604* (2013.01); *G06F 40/18* (2020.01);
   (Continued)

(58) Field of Classification Search
   CPC ........................................................ G06F 8/36
   (Continued)

(56) References Cited

U.S. PATENT DOCUMENTS

| 5,784,545 A | 7/1998 | Anderson |
| 5,926,822 A | 7/1999 | Garman |

(Continued)

OTHER PUBLICATIONS

Hoi Yee Kong, "Development of a SNP Validation Toolset for Wheat", Dissertation, Lincoln University, dated 2015.
(Continued)

*Primary Examiner* — Francisco J Aponte
(74) *Attorney, Agent, or Firm* — Hickman Becker Bingham Ledesma LLP

(57) ABSTRACT

In an embodiment, a data processing method comprises accessing a computer memory comprising a shareable cell-based computation notebook comprising: notebook metadata specifying a kernel for execution, and a computational cell comprising cell metadata, a source code reference, and an output reference, wherein the cell metadata identifies a particular version of source code of a function that defines an input dataset, a transformation, and one or more variables that are to be associated with output data that is to be generated as a result of executing the particular version of the source code; updating the source code reference to identify a first storage location that is to contain the particular version of the source code of the function; and updating the output reference to identify a second storage location that is to contain the output data that is to be generated as a result of executing the particular version of the source code identified in the cell metadata using the kernel specified in the notebook metadata, wherein the method is performed by one or more computing devices.

20 Claims, 11 Drawing Sheets

Related U.S. Application Data continuation of application No. 16/357,108, filed on Mar. 18, 2019, now Pat. No. 10,783,148, which is a continuation of application No. 15/980,647, filed on May 15, 2018, now Pat. No. 10,282,450, which is a continuation of application No. 15/673,231, filed on Aug. 9, 2017, now Pat. No. 10,002,163.

(60) Provisional application No. 62/376,792, filed on Aug. 18, 2016.

(51) Int. Cl.
*G06F 40/18* (2020.01)
*G06F 9/455* (2018.01)
*G06F 21/60* (2013.01)

(52) U.S. Cl.
CPC .............. *G06F 2009/45579* (2013.01); *G06F 2009/45587* (2013.01)

(58) Field of Classification Search
USPC ........................................................ 717/163
See application file for complete search history.

(56) References Cited

U.S. PATENT DOCUMENTS

| | | | |
|---|---|---|---|
| 6,104,325 | A | 8/2000 | Liaw |
| 6,282,551 | B1 | 8/2001 | Anderson |
| 7,319,945 | B1 | 1/2008 | Shapiro |
| 7,810,032 | B2 | 10/2010 | Bauchot |
| 8,825,689 | B2 | 9/2014 | Fedorenko et al. |
| 8,875,090 | B2 | 10/2014 | Fox |
| 9,009,664 | B2 | 4/2015 | Muddu |
| 9,043,753 | B2 | 5/2015 | Fox |
| 9,207,931 | B2 | 12/2015 | Fox |
| 9,244,679 | B1 | 1/2016 | Arellano |
| 9,330,095 | B2 | 5/2016 | Fedorenko |
| 9,405,739 | B1 | 8/2016 | Nguyen |
| 9,442,700 | B2 * | 9/2016 | Sarid ...................... G06F 9/451 |
| 9,448,772 | B2 | 9/2016 | Gulwani |
| 10,768,904 | B2 * | 9/2020 | Wenskovitch, Jr. ...... G06F 8/33 |
| 2013/0290940 | A1 | 10/2013 | Palanisamy |
| 2014/0096127 | A1 | 4/2014 | Kimmet |
| 2014/0173563 | A1 | 6/2014 | Dias |
| 2015/0095923 | A1 | 4/2015 | Sarid |
| 2016/0004531 | A1 | 1/2016 | Stephens |
| 2016/0077830 | A1 | 3/2016 | Grant et al. |
| 2016/0357531 | A1 | 12/2016 | Trofin |
| 2018/0052891 | A1 | 2/2018 | Shuster |
| 2018/0088925 | A1 | 3/2018 | Emeis |
| 2019/0042286 | A1 | 2/2019 | Bailey |
| 2019/0129769 | A1 | 5/2019 | Freeh |
| 2019/0213191 | A1 | 7/2019 | Shuster |
| 2019/0243619 | A1 | 8/2019 | Fink |
| 2019/0347672 | A1 | 11/2019 | Chaar |
| 2019/0369968 | A1 | 12/2019 | Brown |
| 2020/0067789 | A1 | 2/2020 | Khuti |
| 2020/0133638 | A1 | 4/2020 | Wenskovitch, Jr. et al. |
| 2020/0380001 | A1 | 12/2020 | Shuster |

OTHER PUBLICATIONS

Current Claims for European Patent Application No. 17186207.1, dated Apr. 8, 2020, 3 pages.

E. Tejedor et al., Journal of Physics: Conference Series, Data Mining as a Service (DMaaS), dated 2016.

European Claims in application No. 17 186 207.1-1224, dated Nov. 2019, 4 pages.

European Claims in application No. 171862047.1-1954, dated Nov. 2017, 4 pages.

European Claims in application No. 17186207.1-1224, dated Jul. 2018, 3 pages.

European Patent Office "Search Report" in application No. 171862047.1-1954, dated Nov. 14, 2017, 11 pages.

European Patent Office, "Search Report" in application No. 17 186 207.1-1224, dated Nov. 28, 2019, 7 pages.

Cook, Joshua, "Docker for Data Science Duilding Scalable and Extensible Data Infrastructure Around the Jupyter Notebook Server", Apress, dated Aug. 23, 2017.

Felipe et al. "Collecting and Analyzing Provenance on Interactive Notebooks: When Ipython Meets No Workflow" dated Jul. 8-9, 2015.

Shen, Helen, Toolbox Interactive Notebooks:, Sharing the Code, dated Nov. 6, 2014, vol. 515, Nature, 2014.

Jupyter.Org "Jupyter Documentation, Release 4.1.1 Alpha", dated Aug. 10, 2016, pp. 1-105.

Jupyter.org: "Ipywidgets Documentation—Release 6.0.0.dev", dated Jul. 22, 2016, https://duildmedia.readthedocs.org/media/pdf/test-widgets/doc-js/test-widgets.pdf, 47 pages.

Kitchin, John R., "Examples of Effective Data Sharing in Scientific Publishing," United States—ACS Catal. 2015, 5, 3894-3899.

Kitchin, John, "Examples of Effective Data Sharing in Scientific Publishing", dated 2015, pp. 3894-3899.

Kluyver et al., "Jupyter Notebooks a Publishing Format for Reproducible Computational Workflows" dated 2016, pp. 87-90.

Official Communication for European Patent Application No. 17186207.1, dated Apr. 15, 2021, 4 pages.

Perez et al., "Project Jupyter: Computational Narratives as the Engine of Collaborative Data Science", dated 2015.

Pimentel et al., Collecting and Analyzing Provenance on Interactive Notebooks: When IPython Meets noWorkflow New York University USA—TaPP 2015, Jul. 8-9, 2015, Edinburgh, Scotland.

European Patent Office, "Search Report" in application No. 17 186 207.1-1224, dated Jul. 27, 2018, 7 pages.

U.S. Appl. No. 16/357,108, filed Mar. 18, 2019.

U.S. Appl. No. 15/980,647, filed May 15, 2018.

U.S. Appl. No. 15/673,231, filed Aug. 9, 2017.

Shuster, U.S. Appl. No. 16/994,276, filed Aug. 14, 2020, Notice of Allwance and Fees Due, dated Sep. 16, 2021.

Shuster, U.S. Appl. No. 15/980,647, filed May 15, 2018, Notice of Allowance, dated Dec. 20, 2018.

Shuster, U.S. Appl. No. 15/980,647, filed May 15, 2018, First Office Action Interview, dated Oct. 18, 2018.

Shuster, U.S. Appl. No. 15/673,231, filed Aug. 9, 2017, Notice of Allowance, dated Feb. 13, 2018.

Shuster, U.S. Appl. No. 15/673,231, filed Aug. 9, 2017, Notice of Allowance, dated Jan. 17, 2008.

Shuster, U.S. Appl. No. 15/673,231, filed Aug. 9, 2017, Corrected Notice of Allowance, dated Apr. 2, 2018.

Shuster, U.S. Appl. No. 15/637,231, filed Aug. 9, 2017, Pre Office Action Interview, dated Dec. 11, 2017.

Shuster, U.S. Appl. No. 16/357,108, filed Mar. 18, 2019, Notice of Allowance, dated May 15, 2020.

* cited by examiner

Fig. 7

MANAGING SHARABLE CELL-BASED ANALYTICAL NOTEBOOKS

BENEFIT CLAIM

This application is a continuation of application Ser. No. 16/994,276 filed Aug. 14, 2020, which is a continuation of application Ser. No. 16/357,108 filed Mar. 18, 2019, now U.S. Pat. No. 10,783,148, which is a continuation of application Ser. No. 15/980,647 filed May 15, 2018, now U.S. Pat. No. 10,282,450 B1, which is a continuation of application Ser. No. 15/673,231 filed Aug. 9, 2017, now U.S. Pat. No. 10,002,163 issued Jun. 19, 2018, and claims the benefit under 35 U.S.C. § 119 of application 62/376,792, filed Aug. 18, 2016, the entire contents of each of which are hereby incorporated by reference as if fully set forth herein. Applicant hereby rescinds any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as they appear in the Patent and Trademark Office patent files or records, but otherwise reserves all copyright rights whatsoever. © 2022 Palantir Technologies Inc.

FIELD OF THE DISCLOSURE

The technical field of the present disclosure is software development environments, which are computer programs that facilitate authoring, running, and correcting other computer programs. Another technical field is data analytics and development environments that are intended for use in developing statistics or other data analysis programs and graphical visualizations. Another technical field is graphical user interfaces (GUIs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Open source software in the field of statistical analysis of data has become widely used. An example is the JUPYTER system. However, current approaches for developing statistical analysis programs suffer from a number of problems. They are difficult to share with other users or within technical or analytical teams; the programs usually combine views of source code and output data, which means that sharing a program mandates sharing the output data, which is undesirable to enforce access control regimes or security barriers. It is not easy for users to reuse a function or program, or learn what they contain. Collaboration, code reuse and discovery of the work of others are all are difficult because the system was designed for individuals working alone. For example, sharing code typically requires copying and pasting code from one location to another.

In particular, the programs tend to be compact and discrete, that is, dedicated to a particular analytic function such as linear regression. However, as large number of such compact programs are created and stored, and given the difficulty of sharing them, the problem of uninformed rework becomes acute. That is, one development team within an enterprise may have created and stored a program to perform a particular type of analysis that is identical to another program created earlier by a different team that is stored in a different place with a different name. Simply finding analytical programs that others have written, to avoid rework, is not easy with current approaches.

Still another issue is presentation to non-technical users. Typical statistical analysis systems always expose program source code to all users, which can be intimidating or meaningless for non-technical users, who have no interest in coding but wish to interact with the system at a higher level by entering data and seeing results. In addition, the exposure of code listings in the interface can obfuscate the locations where inputs or variables could be changed to yield new results.

SUMMARY

The appended claims may serve as a summary of the disclosure.

BRIEF DESCRIPTION OF THE DRAWINGS

In the drawings:

FIG. 7 illustrates an example association of an input panel, source code excerpt, and output example that can be created in the example software development program that is further described in this disclosure.

DETAILED DESCRIPTION

Figure 1:
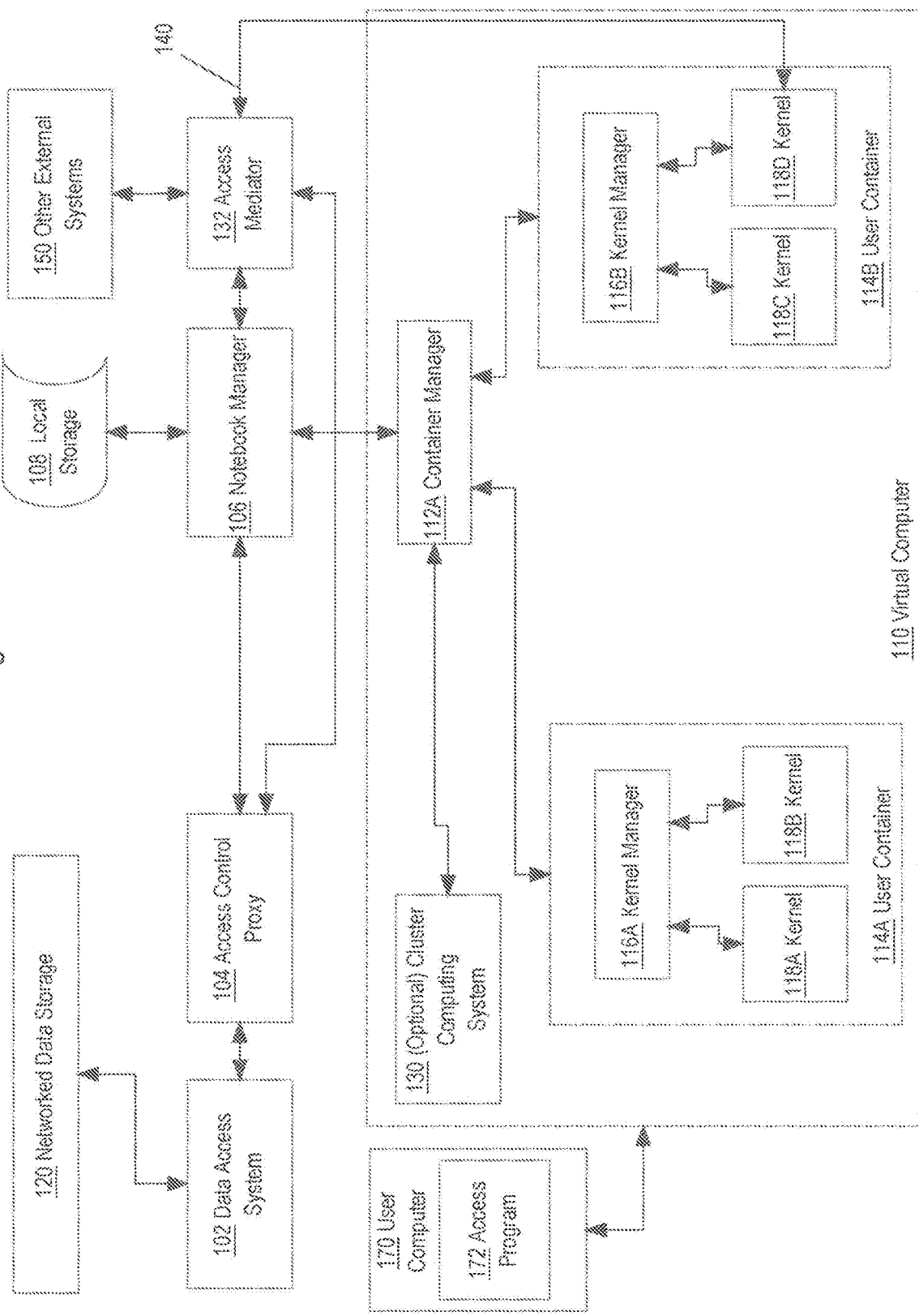
FIG. 1 illustrates an example computer system that is configured to perform the functions described herein, shown in an example networked environment with other systems with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE COMPUTER SYSTEM ARCHITECTURE FOR MANAGING SHARABLE CELL-BASED COMPUTATION NOTEBOOKS
  2.1. STRUCTURAL OVERVIEW
  2.2. NOTEBOOK, CELL AND METADATA OVERVIEW
3. EXAMPLE GRAPHICAL USER INTERFACE FOR CREATING, MANAGING AND EXECUTING SHARABLE CELL-BASED COMPUTATION NOTEBOOKS
  3.1 MENU, TOOLBAR, WORKSPACE, VIEW CONTROL
  3.2 NOTEBOOK EXAMPLE
  3.3 HELPER FUNCTIONS
4. IMPLEMENTATION EXAMPLE—HARDWARE OVERVIEW

1. General Overview

In an embodiment, a data processing method comprises creating and storing a plurality of analytical notebooks in digital computer storage, wherein each of the analytical notebooks comprises notebook metadata that specifies a kernel for execution, and one or more computational cells, wherein each of the cells comprises cell metadata, a source code reference and an output reference; receiving, in association with a first cell among the one or more cells, first input specifying computer program source code of a function, wherein the function defines an input dataset, a transformation, and one or more variables associated with output data; storing the first cell, excluding the output data, using a first digital data storage system and updating the source code reference to identify the first data storage system; using the kernel specified in the notebook metadata, executing an executable version of the source code to result in generating the output data; storing the output data using a second digital data storage system that is separate from the first digital data storage system and updating the output reference to identify the second data storage system.

In one feature, the method further comprises hosting a first analytical notebook from among the plurality of analytical notebooks in a first user container of a containerized program execution system in a virtual computing environment, and hosting a second analytical notebook from among the plurality of analytical notebooks in a second user container of the same containerized program execution system, wherein the second user container is different than the first user container. In one aspect, the method further comprises starting execution of a first plurality of different execution kernels in the first user container and starting execution of a second plurality of different execution kernels in the second user container.

In another feature, the method further comprises creating and storing, as part of the cell metadata, a library versionset value that represents all program code libraries and all version numbers of the program code libraries on which the source depends; and creating and storing, as part of the cell metadata, a dataset versionset value that represents version values for one or more datasets that the source code specifies as input sources. In one aspect, the method further comprises receiving input requesting to execute the first cell; determining whether the first cell is connected to program code libraries having version numbers that correspond to the library versionset value in the cell metadata of the first cell; performing one or more generating a notification message blocking execution of the first cell when the first cell is connected to program code libraries having version numbers that do not correspond to the library versionset value in the cell metadata of the first cell. In another feature, the method comprises determining whether the first cell is connected to one or more datasets that the source code specifies as input sources and having dataset version values that match a dataset versionset value in the cell metadata of the first cell; performing one or more of generating a notification message or blocking execution of the first cell when the first cell is connected to one or more datasets having dataset version numbers that do not correspond to the dataset versionset value in the cell metadata of the first cell.

In an embodiment, the method comprises, during or after execution of the source code of the first cell, determining names of variables that are then currently in memory representing a local scope of the first cell and obtaining then-current values of the variables; generating and displaying a view of the names of the variables and the then-current values of the variables in a user interface that also shows the first cell.

In another embodiment, the method further comprises receiving input that is associated with adding a data entry dashboard to the first cell; in response to the input, automatically creating and displaying a data entry dashboard in association with the first cell, wherein the data entry dashboard comprises a graphical user input panel having a plurality of user interface widgets, wherein each of the user interface widgets matches a data type of a variable that is defined in the source code; receiving a plurality of data values in the user interface widgets; and causing re-execution of the source code of the first cell using the plurality of data values that were received via the user interface widgets to result in generating updated output data based on the plurality of data values.

In yet another feature, the method further comprises generating and displaying a text entry box associated with a search function; receiving a search term in the text entry box; searching one or more data repositories to identify one or more items of cell metadata that matches the search term; and generating and displaying a list of functions of cells or notebooks which functions are associated with cell metadata that matches the search term.

2. Example Computer System Architecture for Managing Sharable Cell-Based Computation Notebooks 2.1 Structural Overview FIG. 1 illustrates an example computer system that is configured to perform the functions described herein, shown in an example networked environment with other systems with which the system may interoperate. In an embodiment, a data access system 102 is communicatively coupled to networked data storage 120 and to an access control proxy 104. A notebook manager 106 is coupled to the access control proxy, to local storage 108, to an access mediator 132, and to a container manager 112A in a virtual computer 110. Container manager 112A is further coupled to one or more user containers of which two user containers 114A, 114B are shown in FIG. 1 for purposes of illustrating a clear example. Each user container hosts or executes a kernel manager and one or more kernels for execution of code, of which two kernels 118A, 118B are shown in a first user container 114A and two kernels 118C, 118D are shown in a second user container 114B, for purposes of illustrating a clear example. The data access system 102 may be considered a first digital data storage system and the local storage 108 may be a second digital data storage system.

In the example of FIG. 1, networked data storage 120 typically but not necessarily comprises cloud-based data storage hosted in a cloud computing center. The specific number and nature of disk drives, storage networks, and/or cloud service providers that form the networked data storage 120 are not critical. Networked data storage 120 is programmed to operate as a highly secure data storage repository to store input data, output data, and/or program source code for sharable cell-based computational notebooks, in various embodiments, as further described.

Data access system 102 is programmed to execute an access control facility that accepts requests to retrieve data objects or files from the networked data storage 120, and determines whether a requesting process, application, and/or user is permitted to create, update, read, update or delete the data objects or files represented in the request. Data access system 102 may be programmed to use access control lists, inheritance principles, realm identification, and other data control measures to determine whether a particular request is permitted. Existing object-based, block-based or file-based security programs or access control systems may be used, in some embodiments.

Access control proxy 104 is programmed to mediate requests generated by the network manager 106 and access mediator 132 and to call application program interface (API) calls or methods of the data access system 102 and to provide responses to calling programs or systems. With this arrangement, developers who write or manage the notebook manager 106 or access mediator 132 do not need domain-specific knowledge of the operations or function calls that the data access system 102 implements; instead, details of API calls for access control can be confined to access control proxy 104, which can be separately developed and managed.

Notebook manager 106 is programmed to create, update, manage and execute cell-based analytical notebooks 202 (FIG. 2) in the manner further described herein, and to generate a graphical user interface that provides software tools and displays to support these operations. In an embodiment, notebook manager 106 is programmed to manage saving and loading of notebooks, widgets, cells and functions, as further described.

Local storage 108 typically is co-located with or logically close to notebook manager 106. Local storage 108 also may be local to a user computer 170, and may be shared across an organization with others. Local storage 108 may inherently support a versioning database, in some embodiments. In some embodiments, local storage 108 stores source code of computational notebooks, functions and/or metadata for notebooks, functions, widgets or cells, excluding the output data. The division of storage of metadata, code, and output data as between local storage 108 versus networked data storage 120 may be a design trade-off based upon available network bandwidth and data performance factors and may be different in various embodiments. In some embodiments, local storage 108 may be implemented using a third party repository such as GITHUB. For example, a user computer 170 may be associated with a user account in a repository system such as GITHUB, and the access credentials for that repository system may be managed using the notebook manager 106, to permit the notebook manager to log in to the GITHUB repository associated with the user account and store functions that the user creates in the correct account.

Access mediator 132 is programmed to manage and coordinate requests and responses between elements such as the kernels of the user containers 114A, 114B, and other external systems 150. In some instances, requests or operations executed by the kernels 118A, 118B, 118C, 118D may be routed to access mediator 132 which may contact access control proxy 104 to obtain data from networked data storage 120 subject to access control validation, or to obtain data from or output data to the external systems 150. In an embodiment, the other external systems 150 may comprise computers, servers or networks of third parties which have a customer or client relationship to a second party that owns or operates the other elements of FIG. 1. For example, the other external systems 150 may be associated with business enterprises or government agencies and the other elements in FIG. 1 may be owned or operated by a professional service provider that provides data analysis and/or investigative services to the enterprises or agencies. Or, external systems 150 may be within the same enterprise or institution as the rest of the elements of FIG. 1, but may provide a specialized function such as knowledge management.

In an embodiment, as further described in connection with FIG. 2 and other drawing figures herein, a sharable cell-based computational notebook comprises a stored association of metadata, source code capable of translation, interpretation or compilation into executable code, and output data that may be stored in different elements of FIG. 1. In an embodiment, individual computer users access, view, execute and manage notebooks using containerized computer systems. For example, in FIG. 1 a virtual computer 110 may host a plurality of user containers 114A, 114B, each of which is associated with a user process. In one embodiment, user containers 114A, 114B are DOCKER containers but other embodiments may use WINDOWS CONTAINER or RED HAT container technology.

Each user container, for example user container 114A, executes a kernel manager 116A that provides the executable code derived from a notebook to a kernel, which may be hosted as a single kernel in the user container or may be one of several concurrently hosted kernels that execute machine code, pseudocode or other code for different source programming languages. For example, with user container 114A, kernel 118A may be the "R" language kernel and kernel 118B may be the "C" language kernel; other kernels may support MATLAB, PYTHON, etc. In some embodiments, each of the kernels is an open source software JUPYTER execution processes that handle running user code and may comprise IPYKERNEL, IRKERNEL, etc. A back-end code execution system also may be provided to run the kernels and interpret the code; for example, a JAVA back-end can be used for this purpose.

In this arrangement, the notebook manager 106 is programmed for hosting a first analytical notebook from among a plurality of analytical notebooks in a first user container of a containerized program execution system in a virtual computing environment, and hosting a second analytical notebook from among the plurality of analytical notebooks in a second user container of the same containerized program execution system, wherein the second user container is different than the first user container. The notebook manager 106 also may be programmed for starting execution of a first plurality of different execution kernels in the first user container and starting execution of a second plurality of different execution kernels in the second user container.

With this architecture, a single user may rapidly switch back and forth between notebooks, or cells or functions within notebooks, that use different source languages and thus require different kernels for execution. This improves the flexibility of the system without sacrificing security integrity. For example, the user of user containers 114A, 114B permits the system to inherently enforce sandboxing principles such that a notebook executing via kernel 118A cannot read or write data on a different user computer or associated with a different user container. Moreover, the use of access control proxy 104 to route data create-read-update-delete operations through the data access system 102 significantly improves security of the system as compared to prior approaches.

Container manager 112A is configured or programmed as a multiplexer to manage multi-tenant operations by orchestrating the instantiation and tear-down of user containers 114A, 114B and others, including signaling the kernel managers 116A, 116B to start, terminate or restart kernels 118A, 118B. Optionally, container manager 112A may be coupled to a clustered computing system 130, such as a SPARK-based cluster system, for the purpose of parallel execution of notebook code.

The use of a containerized system facilitated by container manager 112A and user containers 114A, 114B permits user level and notebook level sandboxing. Containers 114A, 114B, in cooperation with third party container management code, inherently provides sandboxing and permits excluding transactions of other user computers or user accounts. A particular analytical notebook 202 runs in a container and can use all libraries and versions that it depends on even if they are not compatible with the host operating system. This arrangement also promotes accurate reproduction of data analysis at a later time because operating system dependencies are removed. Further, isolation of users in containers improves the posture of the system of FIG. 1 in relation to published information security guidelines or policies.

Arrows in FIG. 1 broadly represent data communication links and can comprise any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links and each may comprise an interface compatible with the network(s) 109 and are programmed or configured to use standardized protocols for communication across the networks such as TCP/IP, Bluetooth, CAN protocol and higher-layer protocols such as HTTP, TLS, and the like.

Each of the functional elements of FIG. 1 may be implemented using one or more computer programs, other software elements, digitally programmed logic such as FPGAs or ASICs, or any combination thereof that are configured or programmed as further described in the text descriptions, algorithms, and other drawing figures herein to carry out the functional operations that are specified in the manner set forth in other sections of this disclosure.

Each of the notebook manager 106, container mediator 112A, kernel managers 116A, 116B, access mediator 132 and access control proxy 104 comprises a set of one or more pages of main memory, such as RAM, in one or more computers into which executable instructions have been loaded and which when executed cause the computers to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of notebook manager 106, container mediator 112A, kernel managers 116A, 116B, access mediator 132 and access control proxy 104 also may represent one or more files or projects of source code that are digitally stored in a mass storage device such as non-volatile RAM or disk storage, which when compiled or interpreted cause generating executable instructions which when executed cause the computers to perform the functions or operations that are described herein with reference to those modules. In other words, the drawing figure may represent the manner in which programmers or software developers organize and arrange source code for later compilation into an executable, or interpretation into bytecode or the equivalent, for execution by the computers.

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

For purposes of illustrating a clear example, FIG. 1 shows a limited number of instances of certain functional elements. However, in other embodiments, there may be any number of such elements. For example, embodiments may use thousands or millions of different user containers 114A, 114B associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

Local storage 108 and networked data storage 120 may implement data management code that is programmed or configured to manage read operations and write operations involving the storage and other functional elements of the system, including queries and result sets communicated between the functional elements of the system and the repository. Examples of data management code include JDBC, SQL server interface code, and/or HADOOP interface code, among others. Local storage 108 or networked data storage 120 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In an embodiment, users interact with virtual computer 110 using user computers 170 configured with an operating system and one or more application programs or apps represented by access program 172 and are coupled via a network link to the virtual computer 110. The virtual computer 110 also may interoperate with the other systems independently and automatically under program control or logical control and direct user interaction is not always required. User computers 170 may comprise a smart phone, PDA, tablet computing device, laptop computer, desktop computer, workstation, or any other computing device capable of transmitting and receiving information and performing the functions described herein and may communicate via a network using a mobile application stored on the computer, or in some embodiments, user computers 170 may be coupled using a cable or connector to the virtual computer 110. A particular user may own, operate or possess and use, in connection with the system of FIG. 1, more than one computing device at a time.

Access program 172 may provide client-side functionality and may comprise a web browser or a local client application or app in various embodiments. User computers 170 may transmit data to, and receive data from, the virtual computer 110 and other elements of the system using web-based protocols or formats such as HTTP, XML and/or JSON, or app-specific protocols. In an example embodiment, the data may take the form of requests and user information input into the user computer 170.

2.2. Notebook, Widget and Metadata Overview

Figure 2A:
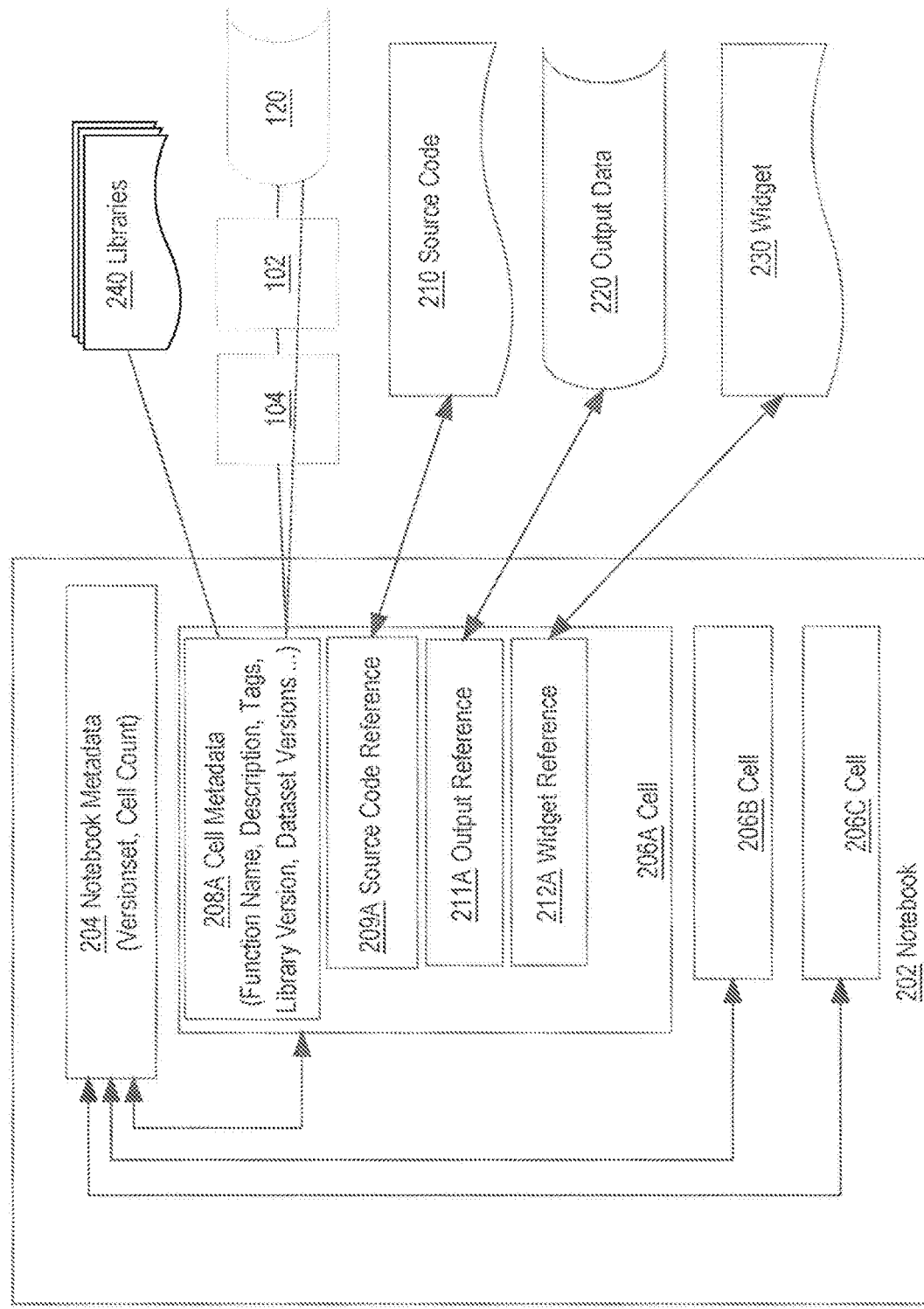
FIG. 2A illustrates an example data structure architecture for a sharable cell-based computation notebook, in one embodiment.

FIG. 2A illustrates an example data structure architecture for a sharable cell-based computation notebook, in one embodiment. A notebook 202, in the embodiment of FIG. 2A, comprises a digitally stored association of notebook metadata 204 and one or more computational cells 206A, each comprising cell metadata 208A, a source code reference 209A to a segment of source code 210, an output reference 211A to a set of output data 220 and optionally one or more widget references 212A to one or more widgets 230. In an embodiment, notebook manager 106 (FIG. 1) is programmed to execute operations that permit creating, updating, executing, finding, storing, sharing, and using notebook 202. For purposes of illustrating a clear example, FIG. 2A shows a single notebook 202 having three (3) cells comprising a first cell 206A and other cells 206B, 206C but other embodiments may have any number of notebooks with any number of cells within a notebook and embodiments specifically contemplate hosting thousands of notebooks each having dozens of cells, or more.

In an embodiment, notebook metadata 204 comprises stored digital values that support management of a notebook as a whole, including but not limited to a versionset value and a cell count value. In an embodiment, the versionset value identifies one or more version numbers for all code libraries and other execution dependencies that exist for the source code 210 that is referenced in all cells of the notebook. In an embodiment, the cell count value may comprise a linked list, array or other set of references to identify the number and location of cells 206A, 206B, 206C are contained in the notebook.

The versionset values enable the system to ensure that a particular execution of a notebook or cell uses the correct version of external program libraries and/or input datasets to yield a particular set of output data. In general, the notebook manager 106 is programmed for creating and storing, as part of the cell metadata, a library versionset value that represents all program code libraries and all version numbers of the program code libraries on which the source depends; and creating and storing, as part of the cell metadata, a dataset versionset value that represents version values for one or more datasets that the source code specifies as input sources. At the runtime stage, version control may comprise receiving input requesting to execute the first cell; determining whether the first cell is connected to program code libraries having version numbers that correspond to the library versionset value in the cell metadata of the first cell; performing one or more generating a notification message blocking execution of the first cell when the first cell is connected to program code libraries having version numbers that do not correspond to the library versionset value in the cell metadata of the first cell. Further, in an embodiment, notebook manager 106 may be programmed for determining whether the first cell is connected to one or more datasets that the source code specifies as input sources and having dataset version values that match a dataset versionset value in the cell metadata of the first cell; performing one or more of generating a notification message or blocking execution of the first cell when the first cell is connected to one or more datasets having dataset version numbers that do not correspond to the dataset versionset value in the cell metadata of the first cell. Further explanation on versioning as applied to notebooks is described in other sections of this disclosure.

Computational cells 206A, 206B, 206C typically are associated with source code 210 that implements one or more programmatic functions for calculating or determining the output data 220 based upon a specified input datasest. For each of the computational cells in the notebook 202, such as cell 206A, the cell metadata 208A comprises a set of stored digital values that facilitate managing that particular cell. In one embodiment, cell metadata 208A includes a version value that corresponds to a particular version of source code 210, output data 220, and one or more dependencies of the source code on other libraries or code. For example, cell metadata 208A may include one or more library version values that effectively act as references to external code libraries 240, and may include one or more dataset version values that effectively act as references to input datasets that may be obtained from networked data storage 120, moderated for access control purposes via the access control proxy 104 and data access system 102. Further explanation of access control and versioning as applied to cells is described in other sections of this disclosure.

The source code reference 209A identifies a segment of source code 210 that is stored in another location. In various embodiments, source code reference 209A may comprise a pathname, URL, pointer, file identifier, or other reference to a networked storage location that contains the source code 210, organized as a file, block, or other discrete data storage unit. In some embodiments, the source code 210 comprises a file in a folder of a filesystem of the virtual computer 110. There may be one file per cell 206A, 206B, 206C of a notebook 202, or one file per notebook. Source code 210 may be created using any programming language that is convenient or useful; examples include PYTHON, MATLAB, R, C, C++, OBJECTIVE-C, JAVA, and the like. A compatible compiler, interpreter or assembler, capable of transforming source code 210 into an executable version of the source code such as machine code, p-code or other code that is capable of execution using one of the kernels (FIG. 1) is presumed to exist within the computer system of FIG. 1. The location and nature of the compiler, interpreter or assembler are not critical. In an embodiment, the source code reference 209A is updated at the time of a storage operation to identify a particular data storage system, or location in the system such as a filesystem path or URL, where the source code has been stored.

The output reference 211A comprises an identifier of a location of a set of output data 220 that has been generated as a result of executing the source code 210 of a particular cell. In various embodiments, the output reference 211A comprises a pathname, URL, pointer, file identifier, database ROWID or other identifier of a specific location in a relational database or versioning database system, and the like. In some embodiments, output data 220 is stored in a location different from that of the source code 210. For example, the output data 220 may be stored in the networked data storage 120 so that access to the output data is managed by access control proxy 104 and data access system 102. In one embodiment, the source code 210 is stored in a filesystem and the output data 220 is stored in a database or key-value store in a different location. A particular notebook 202 provides a view of the output data 220, which is stored elsewhere. In an embodiment, the output reference 211A is updated at the time of a storage operation to identify a particular data storage system, or location in the system such as a filesystem path or URL, where the output data has been stored.

The separation of code storage and output storage, in an embodiment, has numerous benefits. For example, small changes to source code 210 that result in generating vastly more output data 220 do not affect the size of storage of the source code, improving portability and reuse. Further, storing output data 220 using networked data storage 120, mediated by the data access system 102 and access control proxy 104, may promote security or confidentiality of customer or client information or other aspects of the output data. Still further, separation of code and data permits flexible distributed development in which different distributed user computers 170 can be working with different code cells of a notebook 202 at different times, without communication with one another.

In an embodiment, widget reference 212A comprises a name or other identifier of a previously prepared set of source code that perform particular functions, such as code that generates a plot, code that generates a map, code that facilitates a network connection, code that facilitates interoperating with an external data source or data repository, and the like. The use of widget references 212A is optional, and when present, a separate source code reference 209A is not needed. That is, rather than defining cell-specific source code for a user-specified function, a widget reference permits a cell 206A to reference and invoke code for a plot, map, network connection, data source or other predefined utility.

Embodiments provide a basis for knowledge management, discoverability, and collaboration among data analysts, and expose knowledge and results to less technical users such as managers, business executives, program managers, decision-makers, and others. In one embodiment, a notebook 202 created using notebook manager 106 may execute source code 210 that invokes data visualization functions of plotting libraries or other external function libraries. An example compatible plotting library is "plot.ly" which may be accessed via API calls in source code 210 based on PYTHON, MATLAB, R, etc.

As described above, notebook manager 106 may be programmed, in an embodiment, to support versioning of notebooks 202 and cells 206A, 206B, 206C using stored versioning metadata. In one approach, notebook manager 106 is programmed to provide joint versioning of code and datasets that were used with a notebook 202. Storing versioning metadata that applies both to code and datasets permits binding a particular notebook 202 to the libraries that it has used and all the datasets that it has used from the networked data storage 120 or other data sources. In one embodiment, the notebook metadata 204 comprises data identifying all libraries that a notebook 202 depends on or uses, and their version numbers, and all datasets that a notebook has used as input or source data, and their version numbers, for all versions of both the libraries and datasets. In one embodiment, a dataset is imported from the networked data storage 120 and data management services associated with that storage, and/or the data access system 102, provide a transaction number that is unique to a dataset at a particular point in time.

The binding offered by such notebook metadata 204 permits reproducing the output of a particular notebook 202 at a later time, by permitting the user to identify and load, or direct the system to, the same versions of the libraries and datasets that were originally used, with the result that the same output is reproduced as it was when the notebook originally run. In addition, the versioning system described herein permits re-running a notebook 202 at a future time even if a later update to a library resulted in breaking a dependency, by loading an earlier version of that library that is compatible. Further, the approach described herein has the benefit of ensuring that the datasets serving as input data to a notebook 202 or to cells, widgets or functions within the notebook are subjected to dataset-level access controls or permissions that are enforced by the access control system 102 via the access control proxy 104. For example, particular datasets that are needed as input data for a function in a notebook 202 may be subject to different security clearances that drive the availability of the dataset, which requirements may be enforced by the access control system 102 via the access control proxy 104.

Figure 2B:
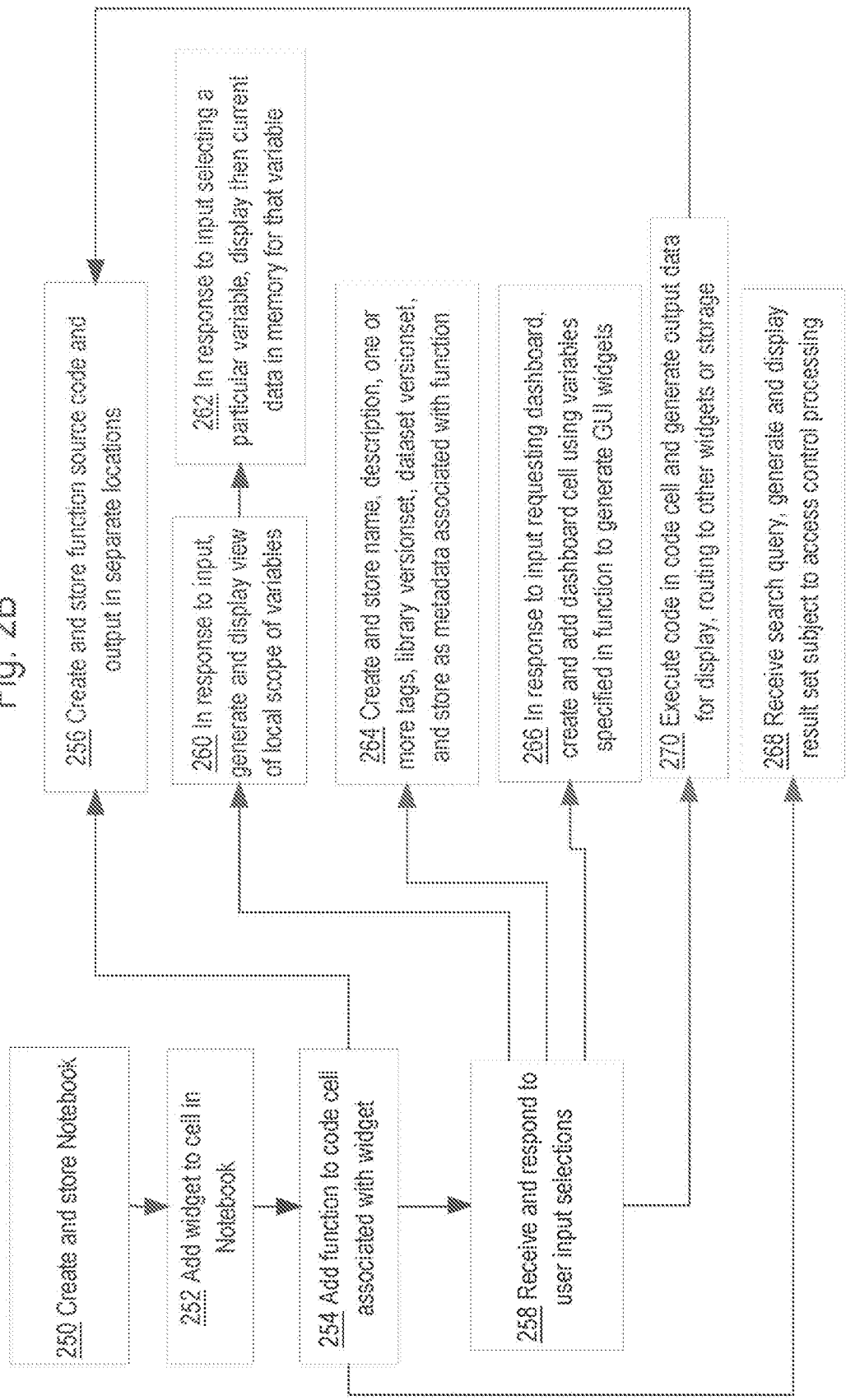
FIG. 2B illustrates an algorithm that may be used to create and manage a sharable cell-based computation notebook, in one embodiment.

3. Example Graphical User Interface for Creating, Managing and Executing Sharable Cell-Based Computation Notebooks FIG. 2B illustrates an algorithm that may be used to create and manage a sharable cell-based computation notebook, in one embodiment. FIG. 2B provides an overview of an algorithm that can be programmed, and other sections of this disclosure provide further detail about how specific functional blocks can be implemented both functionally and terms of other algorithms and programming.

At block 250, a notebook is created and stored. For example, user computer 170 contacts notebook manager 160, logs in to a user account, and requests creating a new notebook 202, specifying a name and kernel type; in response, notebook manager signals container manager 112A to instantiate a new container 114A and to begin executing a kernel that can process code associated with a notebook.

At block 252, a widget is added to a cell in the notebook. Block 252 can comprise, in various embodiments, creating a new code cell 206A by selecting a corresponding icon, and/or selecting a widget control to result in dragging and dropping a representation of a widget into the notebook 202, which causes the notebook manager 160 to create and add a cell 206A, 206B, 206C to the notebook corresponding to the requested widget.

At block 254, the process adds a function to a code cell associated with a widget that was created. Block 254 may comprise using an editor helper or other function editor to type and modify code relating to a function. Additionally or alternatively, as indicated by block 268, the process may receive a search query directed to locating an existing function, and generate and display a result set for matching existing functions, subject to access control processing which may filter the search results.

At block 256, as part of adding a new function to a code cell associated with a widget, function source code and output data are created and stored in separate locations. Block 256 can involve creating and storing a source code file, with empty contents at first and later with function code, and allocating a row in a database or otherwise clearing storage space or database space to hold output for the function.

At block 258, the process receives and responds to user input selections of different kinds. For example, at block 260, in response to input, the process may generate and display a view of the local scope of variables of a notebook, cell or function. The view may consist of a hierarchical list, tree, table or other display of the variables that have been defined for one or more functions of a cell. As seen at block 262, in response to input selecting a particular variable, the process displays the then current data in memory for the variables. As one implementation, notebook manager 160 may determine what variables are currently in memory of the user container 114A that is running the current notebook and function, and provide a view of the values in memory for those variables.

At block 264, the process creates and stores a name, description, one or more tags, a library versionset, and a dataset versionset, and stores these values as a set of metadata associated with the function. Block 264 may comprise receiving input interacting with an editor helper to specify the name, description, tags and so forth, then associating the input values in a data structure that is stored in association with the function for later use in search and other displays.

At block 266, in response to input requesting creating a dashboard, the process creates and adds a dashboard cell in association with another cell, using variables specified in one or more functions of that cell to generate user interface widgets for the dashboard. For example, block 266 may comprise the notebook manager 106 inspecting source code for a first cell, determining the name and data type of all variables defined in the code, creating and linking a new cell to the first cell, and rendering the new cell using a graphical user interface panel and a plurality of GUI widgets that bear the names of the variables and have input boxes sufficient in size to accept data of types corresponding to the data types of the variables. Using non-visible code, the dashboard is linked to the associated first cell, so that input from user computer 170 to the GUI widgets is provided to the code cell and executed, producing data output based on those input values. As a result, an existing code cell becomes linked to a GUI-based input panel that can receive values and cause generating output without the user directly interacting with the source code in the code cell.

At block 270, the process executes code in the code cell and generates output data for display, routing to other widgets, or storage. Block 270 may be invoked using a Play icon or function that the notebook manager 106 exposes in the user interface to notebook 202. Output data can be stored in the separate storage location that was established at block 256. Output data can be displayed directly in a visible cell associated with a code cell, or provided to other cells.

3.1 Menu, Toolbar, Workspace, View Control

Figure 3:
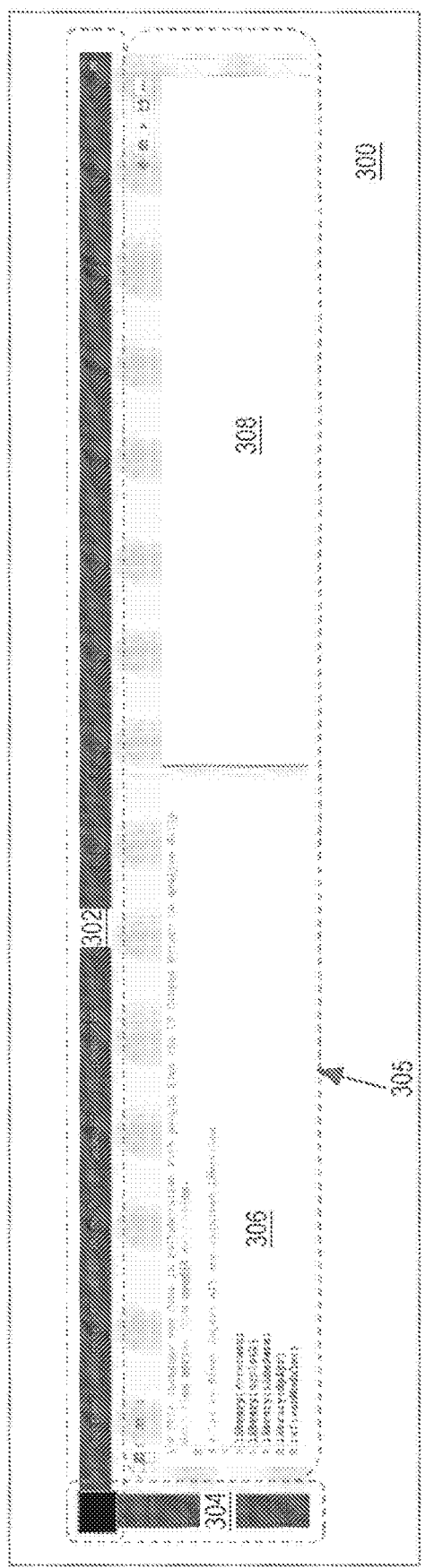
FIG. 3 illustrates an example control menu that may be displayed using a graphic user interface (GUI) in one embodiment of a software development program that facilitates creating sharable cell-based computation notebooks.

FIG. 3 illustrates an example control menu that may be displayed using a graphic user interface (GUI) in one embodiment of a software development program that facilitates creating sharable cell-based computation notebooks. In an embodiment, to create a new notebook 202, a user computer 170 connects to the notebook manager 106 via the virtual computer 110. In an embodiment, an instance of notebook manager 106 executes in one of the user containers 114A and causes generating code or instructions for a graphical user interface that includes a menu with a "new notebook" icon. Interaction of the notebook manager 106 with the user computer 170 and access application 172 to receive and render display instructions results in generating the GUI at the user computer. In an embodiment, selecting the "new notebook" icon causes instantiation of the data structures shown in FIG. 2A, in memory of the virtual computer, to form a new notebook. In an embodiment, the system prompts the user computer 170 to specify a name for the new notebook 202 and a kernel, in the sense of a coding language, for use with the notebook. For example, user input specifies the R kernel, the PYTHON kernel, or another. In response, a view of a blank notebook is displayed on a display screen of the user computer 170.

In one embodiment, a view of a notebook, in a graphical user interface of the user computer 170, comprises a toolbar, sidebar and workspace. In this example, a notebook view 300 as seen in FIG. 3 comprises a graphical toolbar 302, a sidebar 304, and a workspace 305 that comprises widget panels 306, 308. In the example of FIG. 3, widget panel 306 displays a segment of program source code, and widget panel 308 is configured to display output of executing the code. Toolbar 302 comprises a plurality of indicators and selectable links or icons that are programmed to access the functional operations that are further described herein with FIG. 4. Sidebar 304, which is optional in embodiments, displays icons or links for accessing functions of a knowledge management system with which notebooks 202 and notebook manager 106 may be integrated. A widget panel 306 that is associated with program code may be programmed to receive input specifying instructions in a readable computer program source language such as R or PYTHON, and execution of code shown in the panel 306, using a kernel 118A in a user container 114A, causes display of text, plots, graphs or other output in the panel 308. Other panels in the notebook view 300 may be associated with other kinds of widgets that use object inheritance or other programmatic linking techniques to receive output values from other executing code and display plots, maps, graphs or other output.

Figure 4:
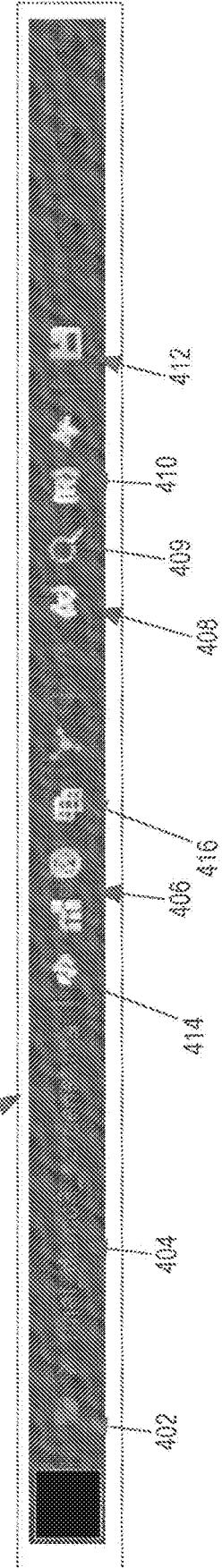
FIG. 4 illustrates an example toolbar that may be displayed using the example software development program that is further described in this disclosure.

FIG. 4 illustrates an example toolbar that may be displayed using the example software development program that is further described in this disclosure. Toolbar 302 comprises filesystem tools 402, 404, widget icons 406, helpers 408, monitoring indicators 410, and a Save icon 412. In an embodiment, filesystem tools 402, 404 are hyperlinks that indicate a storage path, such as a filesystem pathname or URL, and individual name of the notebook 202. In an embodiment, widget icons 406 are links to access code segments that can add, to a notebook 202, operations to analyze, visualize and model data. In an embodiment, selecting one of the widget icons 406 permits dragging and dropping the corresponding widget into the notebook 202, automatically adding executable source code for the corresponding widget to the code panel 306.

In an embodiment, helpers 408 are links to access operations to create better notebooks, such as a search operation, function browsing operation, metadata viewing operations, and the like and are further described in another section of this disclosure.

In an embodiment, monitoring indicators 410 are links to control and monitor kernels, running processes and clustered data execution systems. In an embodiment, monitoring indicators 410 are programmed to cause displaying data indicating the state of a connection to a kernel, the status of clustered computational resources such as SPARK resources, and to provide controls to restart or interrupt kernel processes and other computing processes. For example, with kernel monitoring, in an embodiment each notebook has a connection to an executing kernel and the monitoring indicators 410 permit interrupting execution of a code cell and/or restarting a kernel. In an embodiment, interrupting execution of a code cell will halt execution of code in relation to a kernel while maintaining the kernel as an active process. These functions promote flexibility by permitting malfunctioning or erroneous code to be halted without terminating a notebook or terminating the code that implements the notebook manager 106 or other functions. Instead, each kernel is managed as an independent process within a user container that can be started, interrupted or restarted under the control of the notebook manager 106.

In an embodiment, the Save icon 412 is programmed to cause persistently storing the code, output and metadata of a notebook 202. Various options and embodiments for implementing saving, with access control, are described further in other sections.

3.2 Notebook Example

Figure 5:
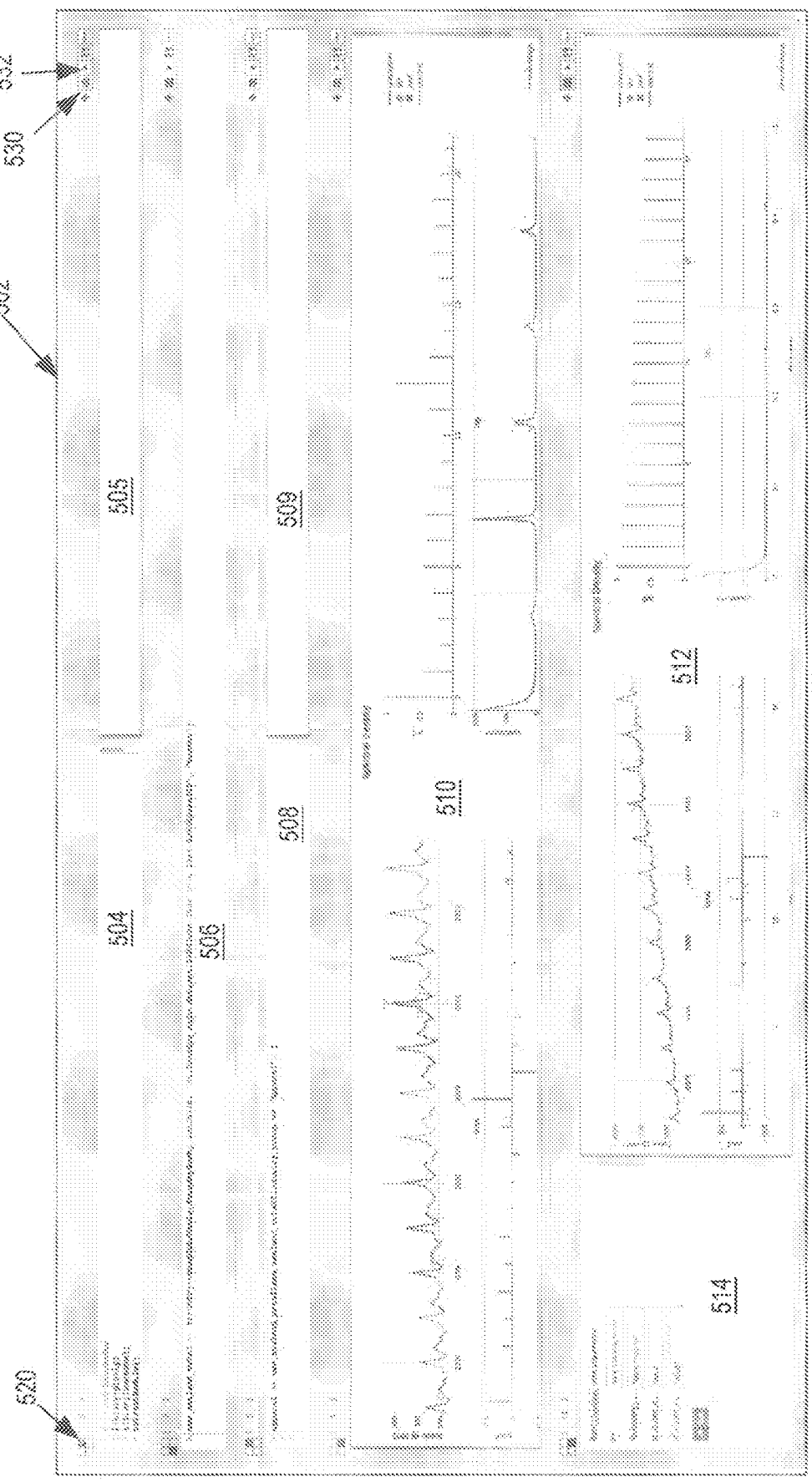
FIG. 5 illustrates an example workspace that may be displayed using the example software development program that is further described in this disclosure.

FIG. 5 illustrates an example workspace that may be displayed using the example software development program that is further described in this disclosure. In the example of FIG. 5, workspace 502 is displayed as part of a graphical user interface and provides a view of a notebook 202 that comprises, in this example, five (5) cells depicted as widgets 504, 506, 508, 510, 512.

Each of the widgets is displayed graphically within a sub panel or rectangle of the workspace 502 in a stacked or layered fashion such that each particular widget extends the full width of the workspace 502. In an embodiment, each of the widgets 504, 506, 508, 510, 512 comprises a view control 520 and helper icons 530. The view control 520 comprises, in one embodiment, a plurality of selectable squares which activate or deactivate views of panels or features of the widgets.

The first three widgets 504, 506, 508 are code widgets having a code cell, typically displayed on the left side of the widget, that contain segments of source code expressed in a human-readable source language and are capable of driving display of output data to an adjacent output cell. For example, code widgets 504, 508 have respective output cells 505, 509 in which output data resulting from execution of corresponding code may be displayed.

Code cells of code widgets 504, 506, 508 may be used to define functions that receive data from a data source, apply a transformation or manipulation, and generate output, often in the form of a plot, map or other visualization. In an embodiment, selecting the save icon 412 (FIG. 4) causes the system to persistently store the function, using the name defined in the source code for that function, in local storage 108. Named storage of functions may promote reuse and discovery of those functions, as further described in other sections herein.

Figure 6:
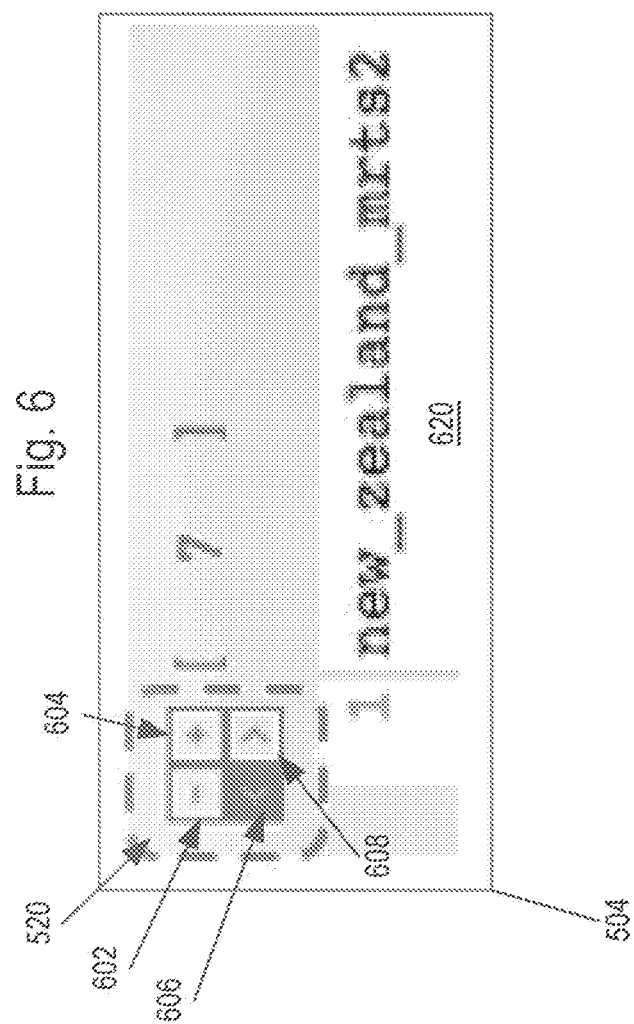
FIG. 6 is an enlarged illustration of an example view control panel in the example software development program that is further described in this disclosure.

FIG. 6 is an enlarged illustration of an example view control panel in one embodiment. In the example of FIG. 6, a code widget 504 comprises a code cell 620 and a view control 520 near the code cell. The view control 520 comprises a − control 602, + control 604, < control 606 and > control 608. Each of the controls 602, 604, 606, 608 is a selectable link or icon that can be invoked using a pointing device, cursor control or keyboard. In an embodiment, selecting the − control 602 causes hiding the entire widget 504. Selecting the + control 604 displays the whole widget 504. Selecting the < control 606 causes displaying only the code cell 620, and selecting the > control 608 causes displaying only the output cell, such as cell 505 (FIG. 5). The code widget 506 (FIG. 5) is an example of a widget that is displayed with the output cell suppressed as specified by the view control of that widget.

In a code widget 504, 506, 508, the code cells are programmed with text editing functionality such that user input may type code characters, keywords, operators and the like, or edit the code. In an embodiment, selecting a Play icon 532 (also seen in FIG. 8) causes the code to execute and output, if any, to be displayed in a corresponding output cell. Referring again to FIG. 4, in an embodiment, the widget icons 406 of toolbar 302 may include an "Add Code" icon or link 414 which, when selected, causes creating a new code widget and adding the new code widget to the workspace 502, either at the top of the existing stack or layers of code widgets or at the bottom, in various embodiments.

Widgets 510, 512 are plot widgets. For purposes of illustrating a clear example, FIG. 5 illustrates only code widgets and plot widgets, but as previously described, the workspace 502 also could include one or more map widgets, network widgets, data widgets, and other widgets. Plot widgets 510, 512 may be dragged and dropped into the workspace 502, or an existing widget or cell, without re-coding the substantive program code that generates plots. Further, named variables can be dragged and dropped into a plot widget, which causes the system to re-execute code for the plot widget using the new named variables and update the display to plot the new data. As a result, code re-use is improved.

Embodiments are programmed to support converting program code to convenient user input panels or dashboards, to promote collaboration and ease of use by non-technical users. In one embodiment, notebook manager 106 is programmed for receiving input that is associated with adding a data entry dashboard to the first cell; in response to the input, automatically creating and displaying a data entry dashboard in association with the first cell, wherein the data entry dashboard comprises a graphical user input panel having a plurality of user interface widgets, wherein each of the user interface widgets matches a data type of a variable that is defined in the source code; receiving a plurality of data values in the user interface widgets; and causing re-execution of the source code of the first cell using the plurality of data values that were received via the user interface widgets to result in generating updated output data based on the plurality of data values.

Figure 7:
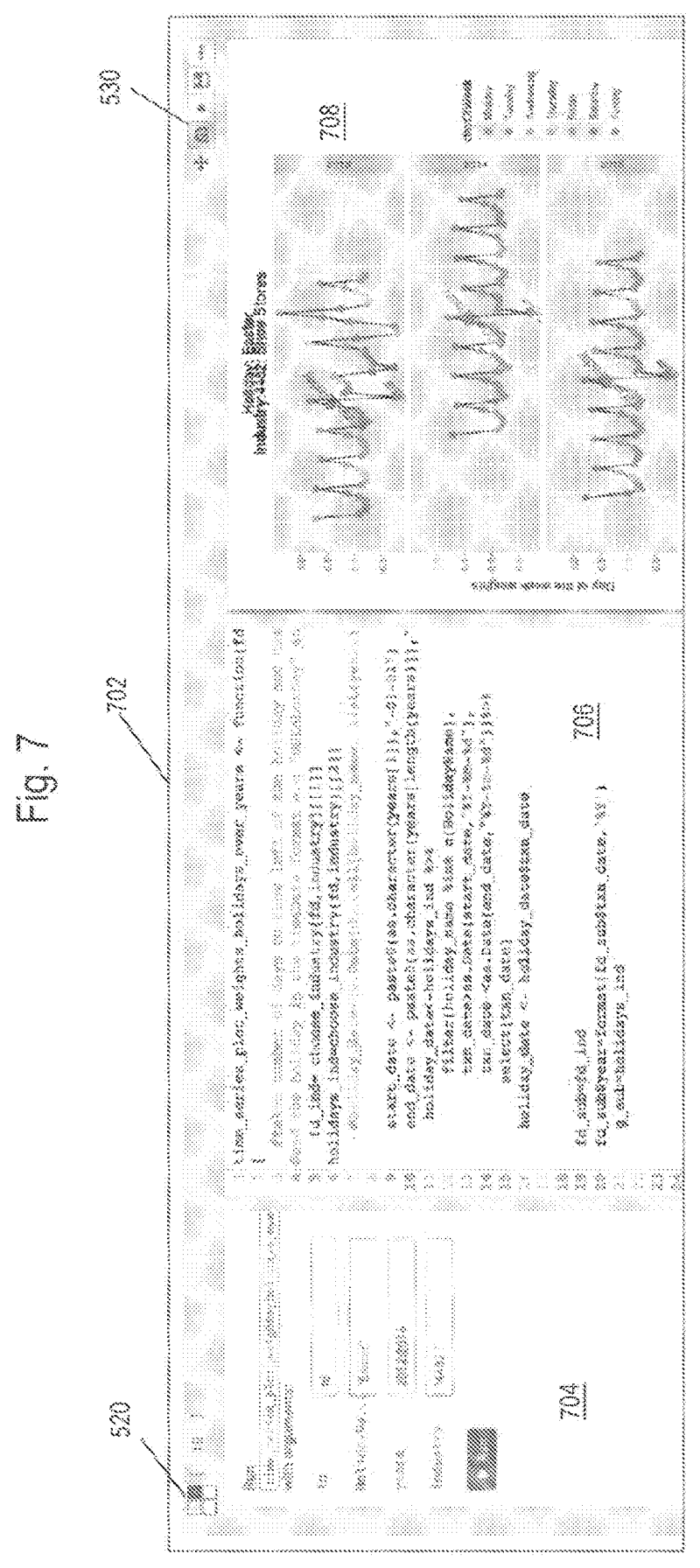

For example, in one embodiment, when a particular widget has keyboard focus or is selected, selecting a dashboard icon 416 in the toolbar (FIG. 4) causes the system to respond by creating and displaying a dashboard in association with the current widget. In the case of plot widget 512, a user input panel or dashboard 514 is displayed adjacent to a graph panel in which graphical output is displayed. The dashboard 514 comprises a plurality of user interface widgets such as text boxes, number boxes, pull-down menus and the like, the form and content of which are determined dynamically based on input variables that have been defined in the executable code of the widget. That is, selecting the dashboard icon 416 immediately creates a dashboard with inputs that match the function definition based on its variables. Further, dashboards can be immediately updated by changing the underlying code in a code cell of a widget. Therefore, a dashboard can display only output and effectively hide the underlying code, so that non-technical users can change input values and obtain new output values without editing the code. FIG. 7 illustrates an example association of a dashboard, source code excerpt, and output example. In the example of FIG. 7, a widget 702 comprises a dashboard 704, code cell 706, and plot cell 708.

Figure 8:
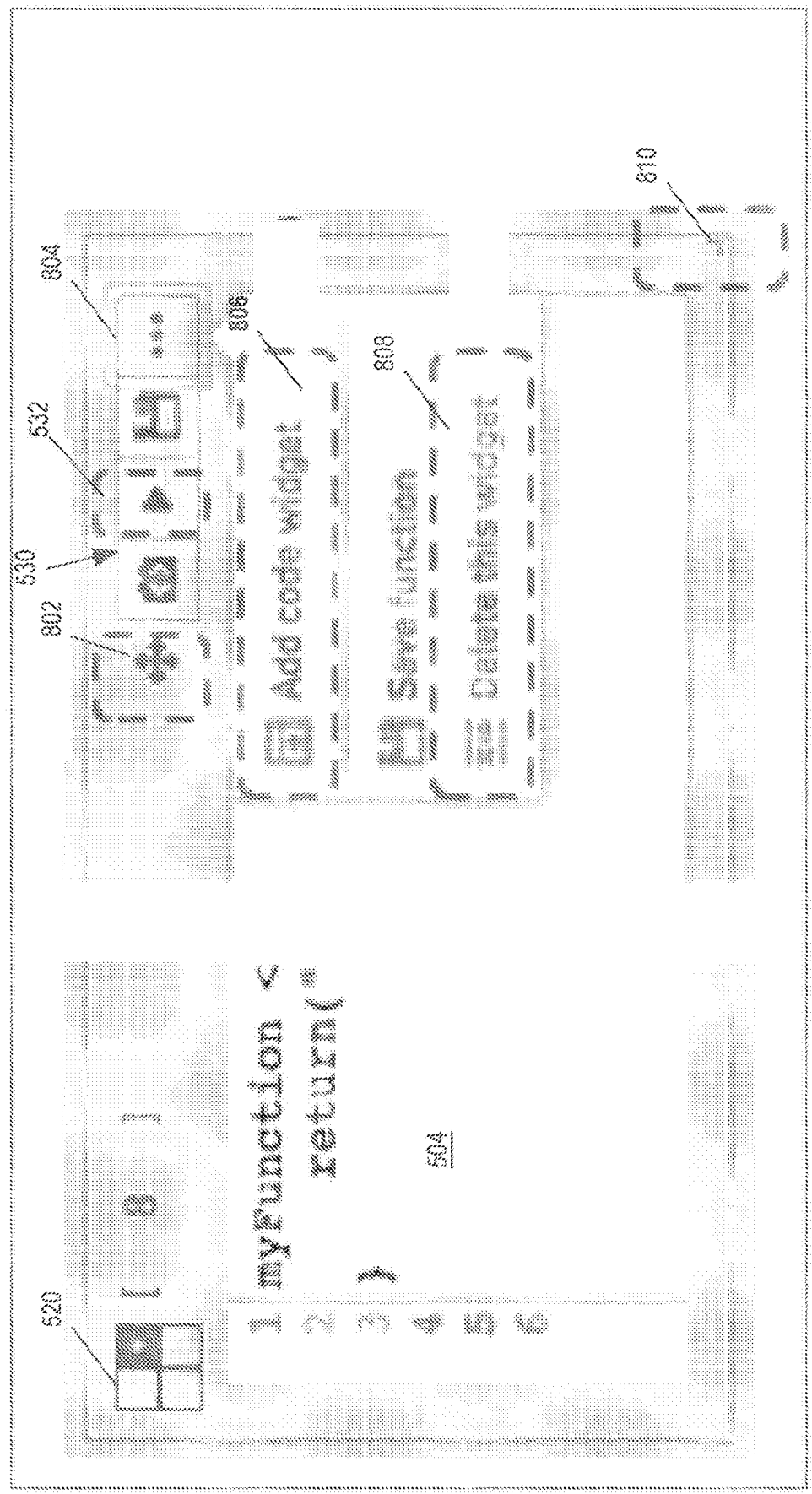
FIG. 8 illustrates an example GUI panel that may be used to execute move, run, add, delete and resize operations in the example software development program that is further described in this disclosure.

FIG. 8 illustrates example other GUI controls for widgets. In an embodiment, each widget such as code widget 504 can use several specialized controls among the helper icons 530 to manipulate widgets. In one embodiment, helper icons 530 comprise a Move control 802 which, when selected, permits moving a particular widget such as code widget 504 to a different location within the workspace 502. In an embodiment, helper icons 530 comprise the Play control that has been previously described, and an Other Controls icon 804 which when selected causes displaying a drop-down menu comprising an Add Code Widget control 806, Save control, and Delete control 808. In an embodiment, selecting the Other Controls icon 804 followed by the Add Code Widget control 806 causes instantiating a new code widget and adding the new code widget to the workspace. The user cursor then is placed in a code cell of the new code widget so that code entry or editing can begin. In an embodiment, selecting \the Other Controls icon 804 followed by the Delete Widget control 808 causes deleting the most recently used or selected widget; in some embodiments a confirmation panel may be displayed to prompt for user input to confirm the delete operation.

In an embodiment, each widget further comprises a resize control 810 that may be displayed in a corner of the widget rectangle, in some embodiments. Selecting the resize control 810 causes the system to accept other input directed toward resizing the bounds of the rectangle in which the widget is displayed, using cursor dragging or other input.

3.3 Helper Functions

In an embodiment, helper icons 530 also include icons or links to helper functions. In some cases, invoking a helper function causes displaying a pop-up panel or menu that prompts the user to enter other input that pertains to a particular helper function. In one embodiment, helper functions comprise an editor and sharing helper, a local scope helper, a search helper, a report helper and a direct acyclic graph (DAG) helper.

EDITOR HELPER. In an embodiment, the editor helper is programmed to receive user input to edit functions in a notebook, promote functions to other local notebooks of other users, and share notebooks across an organization. In an embodiment, editing code includes saving metadata about the local scope of variable values, either in local data storage 108 or networked data storage 120 with access control mediation. Saving local scope metadata permits later viewing of local scope information when working in a cell and previewing data values in memory, as further described herein. This approach provides an improvement for certain programming languages, like R, that do not have static typing, so that upon review of the code another user would not know what type of value to put into a variable. By storing local scope metadata, and supporting annotation of functions, the system helps keep users or other code from providing the wrong type of values to functions.

In one embodiment, the editor helper is programmed to permit testing functions on a preview basis.

In one embodiment, the editor helper is programmed to promote sharing of functions across different notebooks and users. In one approach, the editor helper is programmed to permits adding descriptions of function and the data types of function inputs, effectively adding annotation to functions of an analytical notebook, and thereby increasing the likelihood that particular functions will be discovered by others and imported into their notebooks. For example, in one embodiment, creating a new function permits invoking an annotation panel in which one or more tag values, description values or other metadata may be entered and stored with the function. For example, function may be tagged as a "linear regression method" or "Customer N analytical method", a place of origin, a customer with which it is associated, all customers that have used it, and so forth. Unlike comments in conventional coding, the names, descriptions, and other tag values used in embodiments herein are stored in metadata that is separate from the source code and that is capable of searching and inspection separate from the code of a code cell.

In one embodiment, the editor helper is programmed to respond to invocation of a Save function by committing code of a function to a GIT repository. The particular repository location is configurable and could be a remote GIT instance or the same repository holding code for the notebook manager 106 and other elements of the system FIG. 1. With this approach, any other instance of the system of FIG. 1 that has access to the GIT repository in which a particular function was saved also can access the function. In one embodiment, the editor helper is programmed to save only program code of a widget or code cell, and not the data or output, in the repository. The output data may be saved, if desired, in the networked data storage 120 mediated by the access control system. In this manner, embodiments improve the security of analytical notebook functions by excluding private data from the code storage repository. Further, this approach promotes compactness in storing functions, by keeping verbose output data separate from code and metadata.

In one embodiment, the editor helper includes a notification function which, when selected, permits a user to select a tag value and a notification process by which to obtain automatic notification of related functions that use the same tag. For example, user input may specify the tag value "linear regression" and may identify an e-mail address or phone number; these values are stored in local storage 108, or other storage accessible to the notebook manager 106, as a notification request. In effect, using the notification function, the specified tag value is stored as an automatic search term. Thereafter, when new functions are created and annotated or tagged, and committed to storage, the notebook manager 106 automatically searches the new annotation and tag values to determine if they match any search terms that have been stored in association with a notification request. If a match is found, then the notebook manager 106 automatically generates and sends a notification to the user account that stored the matching notification request. Sending a notification may comprise storing a flag value associated with the user account so that the user receives a visual notification the next time that a notebook is loaded using the system, sending an e-mail message, sending a text message, and so forth.

In an embodiment, the editor helper stores a newly created function in association with an access control value that matches the then-current access control value or level of the user account that created the new function. With this approach, each new function automatically is subject to access controls that are equivalent to the user's role or responsibility, and typically permit only the original user account to find, retrieve or view a new function. In an embodiment, the editor helper is programmed to provide an access control function which, when selected, permits the originating user to specify a different or broader level of access for a particular function. For example, input may specify that the access level is a named group, or a named organization, and thereafter all user accounts within the named group or organization can retrieve, view and use the function. This permits a user to privately create and test a function, then promote its use to a wider audience.

In one implementation of access control and promotion, notebook manager 106 interoperates with access control proxy 104 to identify and apply access control levels. For example, to determine the name of available access control level values, notebook manager 106 may call an API function of the access control proxy 104, which may query the data access system 102 to obtain a list of available access control levels. The notebook manager 106 then presents this list in a user interface display, for example, in a pull-down menu. User input selects one level value in the list, which is stored in association with the function. Thereafter, when the same user account or other user accounts perform searches, the search results are mediated by other queries to the access control proxy 104 to determine whether a requesting user account has access to the access control level value in a particular search result or for a particular function. Then, the output search results only include functions with an access control level value that is equal to or less than the access control value of the requesting user account. At the same time, a particular user computer 170 can, at any time, update the access control value of a particular function to permit groups or organizations to use the function, thereby promoting it to others.

With this approach, notebook manager 106 is programmed to enforce access controls for functions, cells and notebooks, without having to re-implement all aspects of access control, because the name, meaning and effect of various access control levels may be implemented in data access system 102 and accessed via requests, queries or calls to the access control proxy 104. This approach has the benefit of ensuring consistency with an access control system that has already been deployed for other computing elements that might be used by the same user accounts or user computers 170 as the system of FIG. 1.

LOCAL SCOPE HELPER. In an embodiment, a local scope helper is programmed to assist in displaying the names and values of variables that have been instantiated in memory for the current running kernel. For example, in one embodiment, notebook manager 106 is programmed for, during or after execution of the source code of the first cell, determining names of variables that are then currently in memory representing a local scope of the first cell and obtaining then-current values of the variables; and generating and displaying a view of the names of the variables and the then-current values of the variables in a user interface that also shows the first cell.

Figure 9:
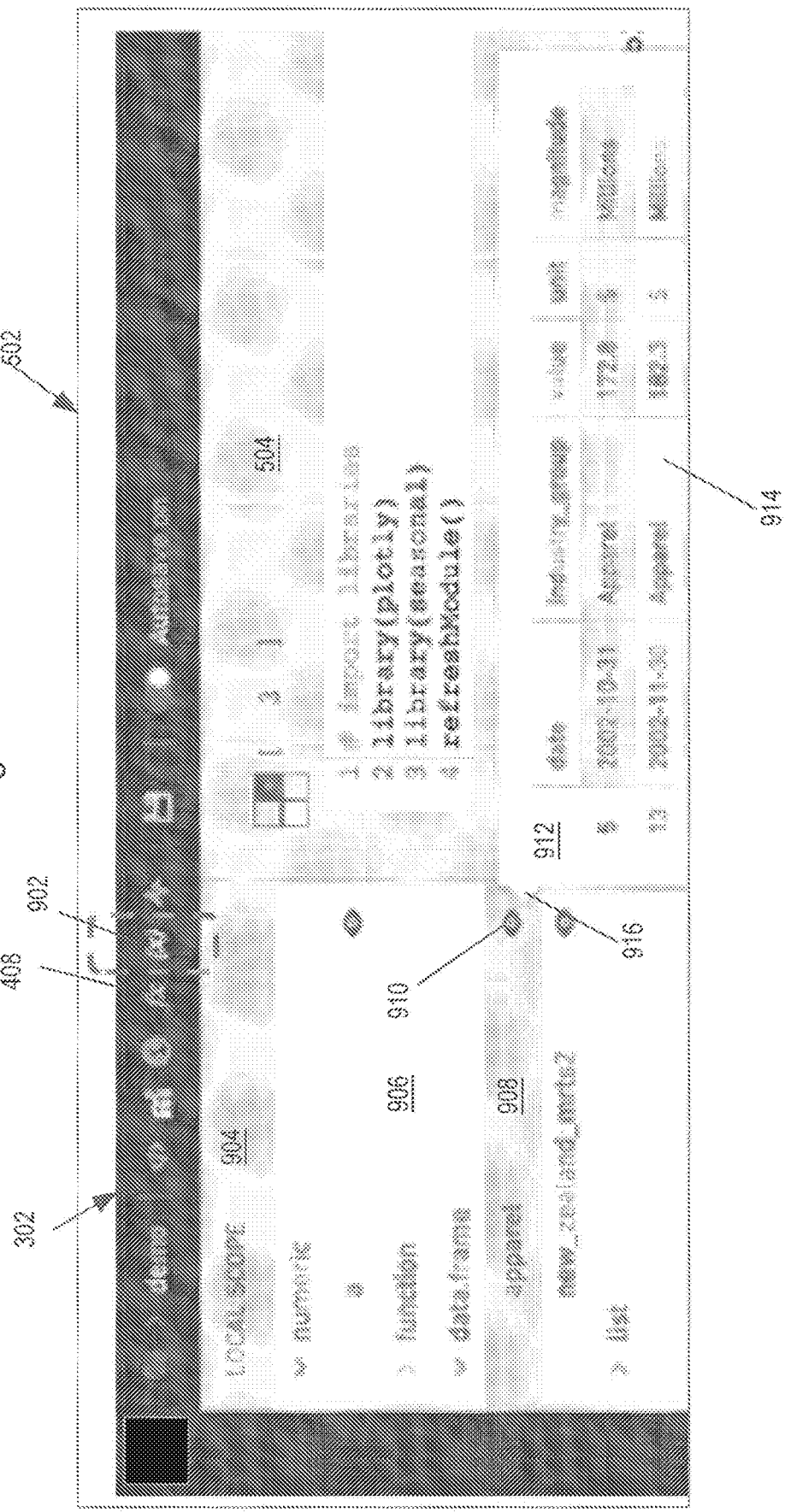
FIG. 9 illustrates a local scope visualization panel in the example software development program that is further described in this disclosure.

FIG. 9 illustrates a local scope visualization panel. In the example of FIG. 9, selecting a local scope helper icon 902 in the toolbar 302 of workspace 502 causes updating the display of the workspace to display a local scope panel 904 and to translate one or more widgets, such as code widget 504, rightward in the display space so that the local scope panel is visible. In an embodiment, local scope panel 904 comprises a hierarchical list 906 of constants, variables and functions that have been defined in the currently selected widget. Each variable and constants is displayed in list 906 using a name that was declared in the code of the selected widget and a visualize control 910 aligned with the name of the variable or constant. For example, FIG. 9 shows a list 906 that includes a data.frame function having an "apparel" variable 908 aligned with an associated visualize control 910. It will be seen that all variables such as "a", "apparel," "new_zealand_mrts2" include a corresponding visualize control 910.

In an embodiment, selecting the visualize control 910 for a particular variable causes the system to display a value visualizing panel 912 adjacent to the local scope panel 904. In an embodiment, the value visualizing panel 912 includes a graphical link 916 that associates the panel 912 with a corresponding variable 908 with which the panel is aligned. Informally, the graphical link "points to" the associated variable 908, in one embodiment. Within the value visualizing panel 912, a data table 914 is displayed. In one embodiment, the data table 914 contains actual output data for the associated variable that has resulted from executing the code of the current widget and is then currently stored in memory associated with the current kernel and user container. In another embodiment, the data table 914 displays a preview of output values for a variable that would be generated if the code was executed. FIG. 9 shows a data table 914 as an example, but in other embodiments for other variables or constants, the visualizing panel 912 may display a single discrete value, a vector or list of values, or other sets of one or more values in various formats and a table is not required.

SEARCH HELPER. In one embodiment, notebook manager 106 is programmed to support searching for and displaying data relating to functions that have been defined using the system, by generating and displaying a text entry box associated with a search function; receiving a search term in the text entry box; searching one or more data repositories to identify one or more items of cell metadata that matches the search term; generating and displaying a list of functions of cells or notebooks which functions are associated with cell metadata that matches the search term.

Figure 10:
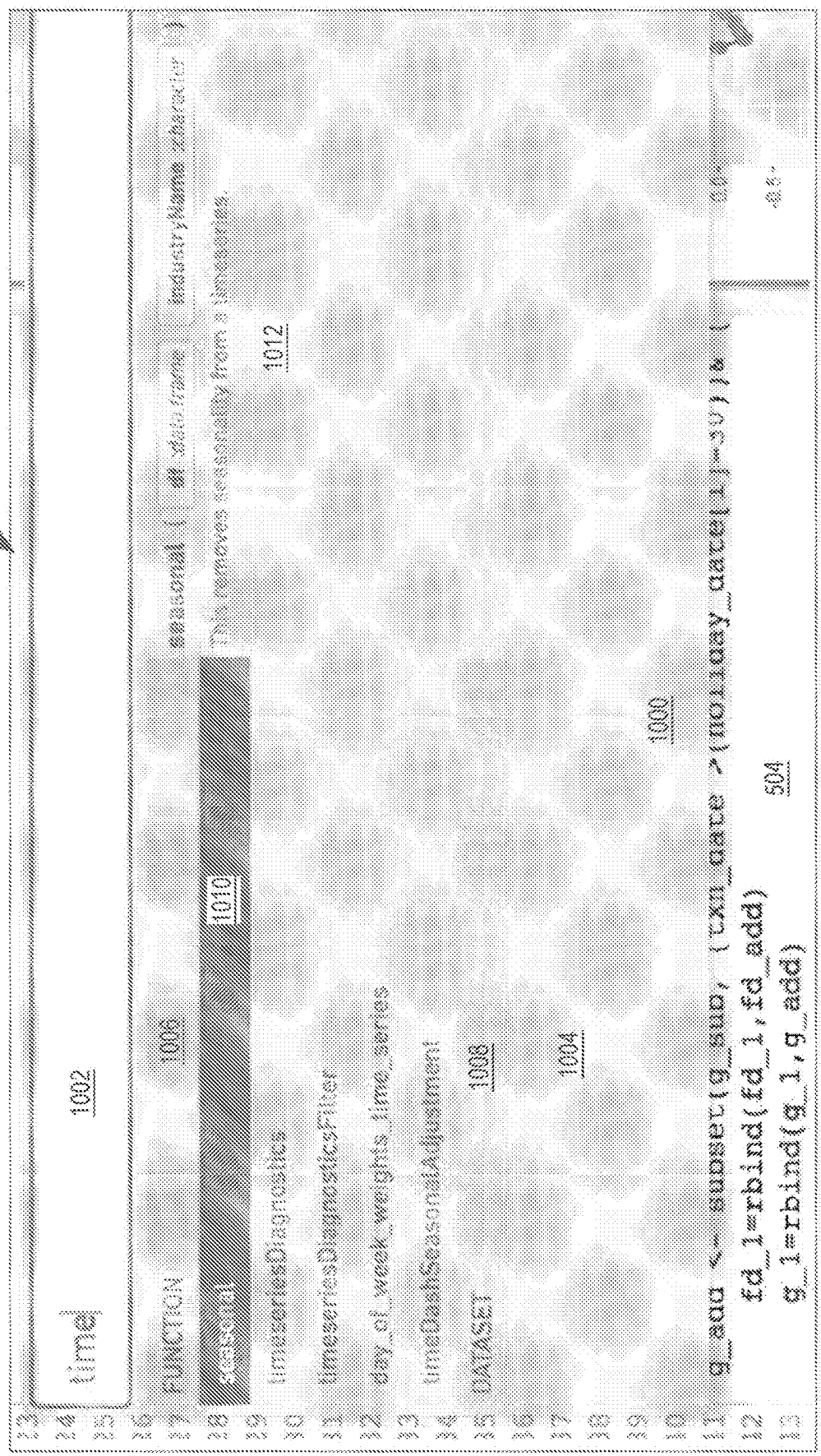
FIG. 10 illustrates an example search panel in the example software development program that is further described in this disclosure.

FIG. 10 illustrates an example search helper panel. In an embodiment, selecting a search icon 409 in the toolbar (FIG. 4) causes the system to display a search panel 1000 that is superimposed over the view of the current widget 504. In an embodiment, search panel 1000 comprises a text entry box 1002 that is programmed to accept a search term or search terms in the form of text input from a user computer and, in response to detecting entry of typed characters, perform a search of stored function names and/or tag values associated with functions. In various embodiments, text entry box 1002 may be programmed to start a search operation using type-ahead techniques that respond to individual characters as they are typed in the text entry box, or await a line ending character such as Enter or Return and respond to that character.

The search helper is programmed to act as a companion to the annotation and tagging capability that has been previously described in connection with editing functions.

Searches may be performed by name, description and other values. In the example of FIG. 10, input consists of the word "time" and, in response, the system has displayed a list 1004 of search results for functions and datasets that include "time" in the name or relate to concepts of time. Matching functions are listed below a function separator bar 1006 and matching datasets (of which there are none in this example) are listed below a dataset separator bar 1008. Search results are presented as a set of interactive, selectable, scrollable items, such as "seasonal" result 1010 indicating a "seasonal" function. Selecting a particular search result item, such as "seasonal" result 1010, causes the system to display a metadata panel 1012 adjacent to the result item that displays stored metadata relating to the search result item. The metadata, for example, can comprise a definition, description, interface summary, list of variables or constants that are used, and so forth.

Further, selecting a search result permits opening and viewing a function including its source code, editing it using the editor helper that has been previously described, and storing the updated function. In this manner, globally applicable edits can be implemented, and code can be improved and reused even when separate users do not directly communicate about the edits.

In an embodiment, search results are obtained from stored data in networked data storage 120 that is mediated by the data access system 102 in response to requests from notebook manager 106 received at the access control proxy 104 (FIG. 1). In this manner, the information seen in FIG. 10 is visible only to users or user computers that have permission to access the information based on existing access control roles, realms or security policies. To support such access control, in an embodiment, saving a function using the Save icon that was previously described causes the system to store the metadata for a function, cell or notebook in the networked data storage after crossing the access control proxy 104 and data access system 102. A copy also may be stored in local storage 108 if that storage is accessible only to a particular user computer or user account that originated the function, cell or notebook. In another embodiment, the search helper is programmed to search only shared resources, such as notebooks, functions or cells that users have affirmatively shared or promoted to others, local scope variables, and the like. The specific scope of search may vary in different embodiments. Using the search helper, users are able to locate functions within notebooks of other users that otherwise would be time-consuming to locate.

4. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
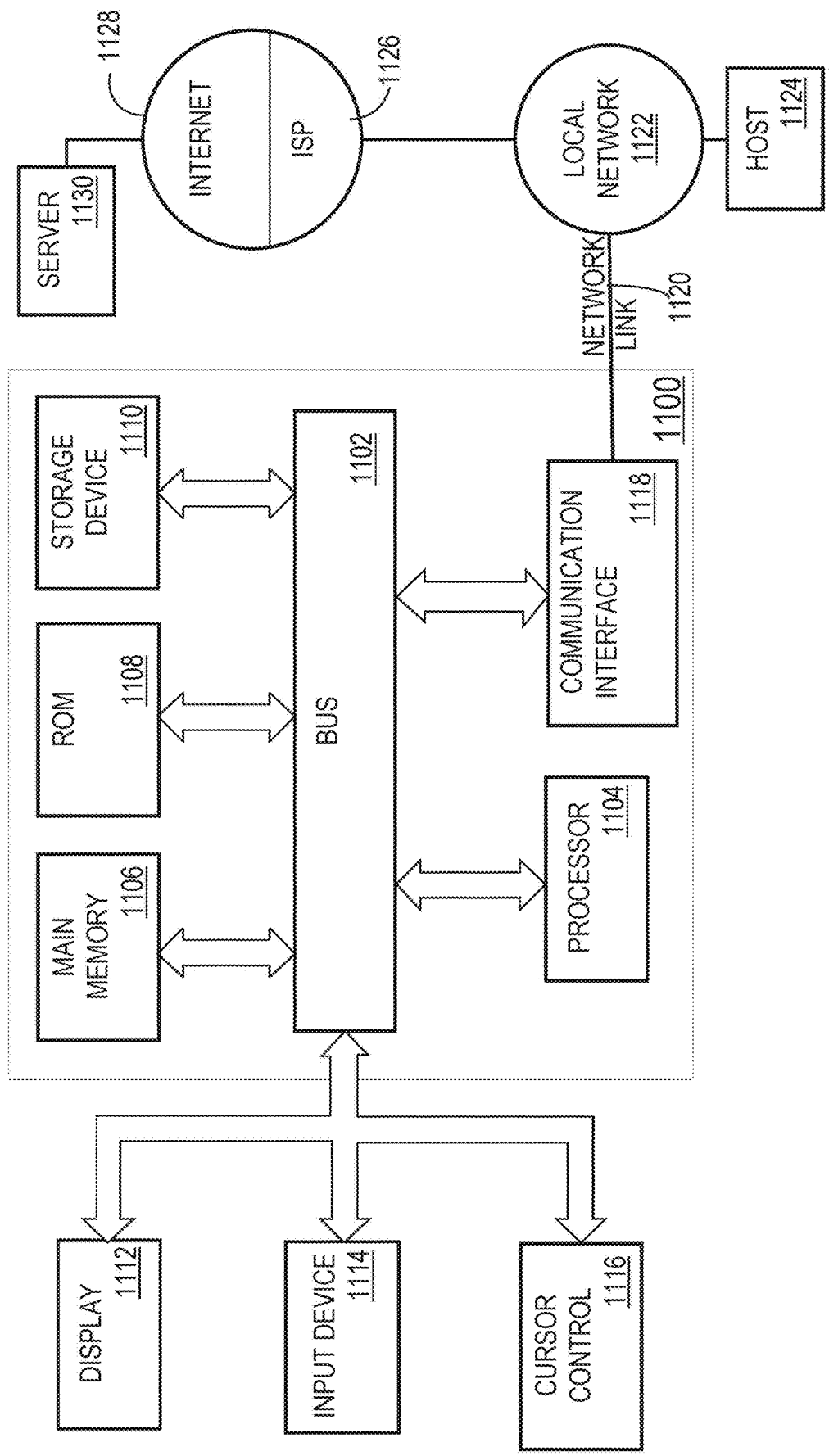
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

What is claimed is:

1. A method, comprising:
   accessing a computer memory comprising a shareable cell-based computation notebook comprising: notebook metadata specifying a kernel for execution, and a computational cell comprising cell metadata, a source code reference, and an output reference, wherein the cell metadata identifies a particular version of source code of a function that defines an input dataset, a transformation, and one or more variables that are to be associated with output data that is to be generated as a result of executing the particular version of the source code;
   updating the source code reference to identify a first storage location that is to contain the particular version of the source code of the function; and
   updating the output reference to identify a second storage location that is to contain the output data that is to be generated as a result of executing the particular version of the source code identified in the cell metadata using the kernel specified in the notebook metadata,
   wherein the method is performed by one or more computing devices.

2. The method of claim 1, wherein the first storage location and the second storage location are subject to different access control systems.

3. The method of claim 1, further comprising:
   creating the particular version of the source code of the function;
   creating the output data;
   storing the particular version of the source code of the function in the first storage location; and
   storing the output data in the second storage location.

4. The method of claim 1, further comprising:
   in response to input, generating and displaying a view of a variable that has been defined for the function of the computational cell.

5. The method of claim 1, further comprising:
   creating and storing at least one versionset value associated with the function.

6. The method of claim 1, further comprising:
   in response to input, rendering a graphical representation of the computational cell, the graphical representation comprising a plurality of widgets representing variables defined in the source code and a plurality of input boxes configured to accept data corresponding to the variables.

7. The method of claim 6, further comprising:
   in response to acceptance of data by a widget of the plurality of widgets, providing the data to the computational cell, and producing, by the computational cell executing the source code, output based on the provided data.

8. The method of claim 1, wherein the notebook is hosted in a user container of a containerized program execution system in a virtual computing environment, the user container comprising a plurality of different execution kernels.

9. The method of claim 1, further comprising:
   providing a search panel for entering one or more search terms;
   determining that the function matches the one or more search terms based on stored metadata for the function; and
   causing display of a list of matching functions that includes the function.

10. The method of claim 9, wherein determining that the function matches the one or more search terms based on stored metadata for the function comprises sending a matching request of the one or more search terms to an access control proxy.

11. A computer system comprising:
one or more processors;
one or more non-transitory computer-readable storage media storing instructions which, when executed by the one or more processors, cause the one or more processors to perform a method comprising:
accessing a computer memory comprising a shareable cell-based computation notebook comprising: notebook metadata specifying a kernel for execution, and a computational cell comprising cell metadata, a source code reference, and an output reference, wherein the cell metadata identifies a particular version of source code of a function that defines an input dataset, a transformation, and one or more variables that are to be associated with output data that is to be generated as a result of executing the particular version of the source code;
updating the source code reference to identify a first storage location that is to contain the particular version of the source code of the function; and
updating the output reference to identify a second storage location that is to contain the output data that is to be generated as a result of executing the particular version of the source code identified in the cell metadata using the kernel specified in the notebook metadata;
wherein the method is performed by one or more computing devices.

12. The system of claim 11, wherein the first storage location and the second storage location are subject to different access control systems.

13. The system of claim 11, wherein the method further comprises:
creating the particular version of the source code of the function;
creating the output data;
storing the particular version of the source code of the function in the first storage location; and
storing the output data in the second storage location.

14. The system of claim 11, wherein the method further comprises:
in response to input, generating and displaying a view of a variable that has been defined for the function of the computational cell.

15. The system of claim 11, wherein the method further comprises:
creating and storing at least one versionset value associated with the function.

16. The system of claim 11, wherein the method further comprises:
in response to input, rendering a graphical representation of the computational cell, the graphical representation comprising a plurality of widgets representing variables defined in the source code and a plurality of input boxes configured to accept data corresponding to the variables.

17. The system of claim 16, wherein the method further comprises:
in response to acceptance of data by a widget of the plurality of widgets, providing the data to the computational cell, and producing, by the computational cell executing the source code, output based on the provided data.

18. The system of claim 11, wherein the notebook is hosted in a user container of a containerized program execution system in a virtual computing environment, the user container comprising a plurality of different execution kernels.

19. The system of claim 11, wherein the method further comprises:
providing a search panel for entering one or more search terms;
determining that the function matches the one or more search terms based on stored metadata for the function; and
causing display of a list of matching functions that includes the function.

20. The system of claim 19, wherein determining that the function matches the one or more search terms based on stored metadata for the function comprises sending a matching request of the one or more search terms to an access control proxy.

* * * * *